Patented Aug. 14, 1934

1,970,255

UNITED STATES PATENT OFFICE

1,970,255

ADSORBENT

George E. Taylor, Westfield, N. J., assignor to General Chemical Company, New York, N. Y., a corporation of New York No Drawing. Application July 12, 1932, Serial No. 622,107

9 Claims. (Cl. 252—2)

This invention relates to an adsorbent silica, and to the method of producing the same. The invention is particularly directed to a process for preparing from clays and silicious materials an active silica for use in purifying, filtering, bleaching and decolorizing oils, solutions and gases.

Several processes for making active earths and various decolorizing and purifying agents have been proposed. Such substances previously employed in the arts may generally be considered as falling within one of two broad classes. The first of these includes earths which are found in their natural state in such condition as to be substantially ready for use. Fuller's earth and bauxite are two well known examples of this type of material. A second generic class, which may be regarded broadly as directed to artificial substances, includes acid treated clays, and gels of various kinds generated, as a rule, by processes involving reactions between soluble silicates and acids. Of the acid treated clays, well known substances resulting from acid treatment of bentonite and montmorillonite are representative, and gels, such as silica gel, are examples of the second type. There is a wide difference between the substances of each broad class both with respect to initial cost of manufacture and their efficiency as decolorizing and purifying agents.

A process has been proposed by which the field of raw materials serving as a source of silica in the finished product is enlarged to include the utilization of clays and silicious materials of different character than theretofore employed, and which provides for the use of clays having little or no original adsorbent or purifying properties in untreated condition as a source of silica in the product. Further, such proposal aims to provide a process by which a superior product can be made from silicious materials constituting the tailings or waste of chemical processes involving the treatment of clays and related silicates and other mineral substances containing substantial amounts of silica and in which processes the silica content is partially or wholly an unsought for constituent.

The prior process may be briefly described as follows: Where the silicious material employed is in the raw condition, e. g. substantially in the original form as mined as a metal silicate, the material is preferably initially dried, crushed and calcined. Following calcination, the material is digested in a strong mineral acid, and the acid soluble constituents then separated from the silicious residue by washing. The silicious residue thus obtained is digested with the aid of heat in an alkaline solution in which the silica forming the active component of the adsorbent product becomes dissolved. Solid undissolved residues are separated from the hot solution, and the active silica is subsequently precipitated from the alkaline solution. The adsorbent thus formed is separated from the solution, and suitably dried. In instances where the silicious material employed is the by-product of a chemical process involving the acid treatment of a silicate and in which acid soluble substances have been separated and removed from the silica, the silicious by-product is directly subjected to digestion in the alkaline solution and to the subsequent treatment, the acid treatment being omitted provided the prior chemical process has been such that the silicious product or by-product thereof is in suitable physical condition for the alkaline digestion.

According to one feature of such prior procedure, the reagents utilized are regenerated in substantially quantitative amounts with the result that one of the major costs of the adsorbent silica produced thereby is largely eliminated. One of the principal phases of the heretofore proposed process comprises the digestion of silicious material in an alkaline solution followed by the precipitation therefrom of the active silica in a gel-like form. As pointed out hereinafter in greater detail, the digestion of silicious material in an alkaline solution and the precipitation therefrom of the active silica is carried out in such manner that the alkaline solution, on completion of the precipitation of the active silica, is transformed back substantially to its original composition and condition, and as such is utilized subsequently for the digestion of additional batches of silicious material. It is to this alkaline digestion stage and the associated regeneration of the alkaline digesting solution that the present invention relates.

It has been found, when operating with certain silicious materials to provide the necessary source of silica, that after the alkaline solution has been used several times for digesting successive batches of silicious material, the capacity of the alkaline solution to dissolve silica from the silicious material is reduced with a consequent drop of efficiency of the process. The investigations upon which the present invention are based indicate that the decrease in efficiency of the alkaline digesting solution is largely because of an accumulation in the solution of successive small quantities of organic matter contained in the silicious material employed. It has been found in accordance with the present invention that by subjecting the silicious material to an oxidation or calcination step, as hereinafter noted temperature conditions, just prior to the alkaline digestion stage, the organic substances included in the silicious material are oxidized and eliminated from the silicious material with the important result that the alkaline digesting solution may be repeatedly regenerated and reused to effect solution therein of the active silica, without the action of the alkaline digesting solution becoming sluggish because of the poisoning effect of the organic material.

One preferred mode of carrying out the present invention utilizing for illustrative purposes, specific raw materials and operating conditions is as follows:

The raw material employed may be a flint clay, substantially kaolinite, and of approximately the following composition:

| | Per cent |
|---|---|
| Alumina ($Al_2O_3$) | 40 |
| Silica ($SiO_2$) | 45 |
| Water ($H_2O$) | 13 |
| Titania, iron oxides, alkalies, etc. | Balance |

The clay is dried, crushed to a suitable degree of fineness, and then calcined at a temperature of approximately 650° C. Following calcination, the clay is cooled and ground. The finely ground calcined clay may then be digested with 40% sulfuric acid for a period sufficient to facilitate the dissolution by the acid of substantially all the readily acid soluble substances. In the particular instance, a large proportion of alumina is liberated, taking the form of aluminum sulfate. To facilitate settling and separation of the solid residue from the aluminum sulfate solution, a small quantity of a suitable coagulant, specifically glue may be introduced into the digest solution as is customary in settling operations of this kind. The aluminum sulfate and other acid soluble substances are then removed from the acid-treated clay by washing with water. After washing and drying the silicious clay residue remaining may analyze substantially as follows:

| | |
|---|---|
| Silica ($SiO_2$) | 70% |
| Alumina ($Al_2O_3$) | 14% |
| Titania, iron oxides, ignition loss, etc. | Balance |

According to the present invention, the silicious clay residue is now calcined with frequent rabbling, at a temperature of about 600–625° C. for about an hour to oxidize and remove from the clay residue organic substances which were included therein. The clay residue is then ground to such an extent that substantially all of the material passes a 300 mesh screen. A mixture comprising one part of ground clay residue to four parts of sodium carbonate in the form of a 20% solution, i. e., 4 parts of sodium carbonate to 16 parts of water, is boiled for about one hour. During the digestion the silica forming the active component of the adsorbent becomes dissolved in the sodium carbonate solution.

On completion of the boiling for the period noted, the digested mass is filtered while the solution is maintained at substantially the same elevated temperature as that of the digestion. During digestion the original clay residue may be reduced approximately 50% by weight.

The clear filtrate remaining after digestion and separation of the mud from the solution while in the hot state apparently contains sodium silicate, sodium bicarbonate and sodium carbonate, some carbon dioxide having been given off during digestion. The filtrate is then cooled to normal temperature. During cooling, the active silica dissolved in the solution precipitates out as a gelatinous mass. After adding to the solution sufficient carbon dioxide to compensate for that given off during digestion, and then permitting the solution to stand for some time, for example about one hour, to further complete precipitation of the silica, the mass is filtered to effect separation of the active silica from the solution. The filtered gel may then be subjected to washing with water to remove sodium carbonate. Subsequently, the gel may be again washed with a weak acid to neutralize any sodium carbonate which may have been left behind. The gel thus obtained may be dried at a temperature of about 110° C. for approximately one hour. The product may be described generally as a white, fluffy powder having an apparent density of approximately 0.2, a loss on ignition of about 20%, and containing in excess of 95% silica figured on an anhydrous basis.

In the initial acid digestion, any suitable acid such as sulfuric, hydrochloric, or nitric acids, or any acid strong enough to effect the removal of alumina may be employed.

Calcination of the original raw silicious material prior to acid digestion while not essential is preferable to aid in the dissolution of the raw material. However, this initial calcination should not be confused with the calcination or oxidation step just prior to the digestion of the clay residue of the acid digestion in the alkaline solution. The final calcination, with which this invention is chiefly concerned, has a function separate and distinct from the initial calcination prior to the acid digestion, in that the second calcination acts to substantially completely eliminate from the silicious material organic material which may have originated in the raw silicious material or may have its source in the organic coagulants employed to facilitate settling after the acid digestion, or other organic material which may have worked into the batch during processing, for example in the form of oily drips from the machinery. The duration of the final calcination may vary from a few minutes to something over an hour. Likewise, the temperatures of the calcination operation may vary over a range from about 300° C. to approximately 750° C. As set forth in the above example, calcination temperatures of about 600–625° C. are preferred, and as a rule this temperature should not exceed about 750° C. Temperatures in excess of this are not desirable since a decrease in silica recovered from the digest solution appears to result. Possibly higher temperatures effect partial sintering of the clay residue, or act to convert silica from a relatively soluble form to one more insoluble. In any event the oxidation operation contemplated by the present invention should be distinguished from mere ignition carried out at higher temperatures which appear to have a deleterious effect with respect to the present process and reduce silica recovery.

The concentration of the sodium carbonate solution may be varied over a considerable range. It appears that dissolution of the active silica is more complete in a relatively concentrated solution, although such concentration may vary from less than 10 to about 24%. A potassium carbonate solution or a solution comprising a mixture of sodium and potassium carbonates of suitable concentration may be employed.

Where the product is to be used as a purifying agent for some types of oils and solutions, it is preferred to remove undissolved residues from the alkaline solution, and to this end separation of the solution and the undissolved residues or mud is effected while the solution is hot, and at a temperature not substantially less than that of digestion.

The filtrate obtained on separation of the insoluble matter unattacked by the digestion with the carbonate is a clear solution, and apparently contains principally, while hot, sodium silicate ($Na_2SiO_3$), sodium bicarbonate ($NaHCO_3$), and sodium carbonate ($Na_2CO_3$). The digestion reaction may be explained on the basis that the sodium carbonate reacts with the silica of the clay residue forming sodium silicate and sodium bicarbonate. The latter in the process of boiling incurs a small loss of carbon dioxide as previously noted. Upon cooling the solution, the silica of the sodium silicate precipitates reforming sodium carbonate in the solution.

In practice, the carbonate digestion may be carried out under such conditions that the carbon dioxide evolved is drawn off and conserved to be turned back into the carbonate solution, either before or after cooling. In accordance with the present invention the latter procedure is preferred. During cooling, the major portion of the silica, upwards of about 90%, is precipitated and substantially all of the silica remaining in solution is precipitated on the addition of the carbon dioxide. In order to determine the carbon dioxide loss during digestion, a sample of the hot filtered carbonate solution is tested on cooling for the presence of sodium silicate, and the carbon dioxide necessary to facilitate complete precipitation of the silica therefrom is determined. The required amount of carbon dioxide is added to the cool carbonate solution as carbon dioxide gas, or in the form of sodium bicarbonate in sufficient quantities to furnish the necessary amount of carbon dioxide. In whatever form the carbon dioxide is added, the quantity thereof should preferably be sufficient to compensate for that lost during digestion, or in other words, the amount of carbon dioxide added should preferably be enough to convert the solution back to a sodium oxide to carbon dioxide molecular ratio of one to one.

After the filtration and removal of the gel from the solution, the latter, which has been substantially all transformed back to sodium carbonate on the replacement of the carbon dioxide, is returned to the process and utilized in a subsequent carbonate digestion. It is at this point that the present invention becomes effective to greatly enhance the efficiency of the process when operating with certain kinds of raw materials which may originally contain more or less organic matter, or in situations where organic matter may have been introduced into the silicious material at some point in the process before digestion in the alkaline solution. According to the invention, where the silicious material is subjected to calcination just prior to the alkaline digestion stage, substantially all of the organic matter contained in the silicious material is removed therefrom, and consequently an accumulation of organic matter in the alkaline digesting solution is prevented. It is apparent that the recurrent dissolution of silica from silicious material and the regeneration of the alkaline solution to its initial composition on precipitation of the silica as a gel takes place within what in effect is a closed circuit which retains organic mater from successive batches of silicious material. Hence, by elimination of organic matter prior to the introduction of the silicious material into the alkaline solution, the present invention provides a process by which the poisoning and inhibiting effects of accumulations of organic matter in the alkaline solution are overcome and by which the capacity of the alkaline solution for dissolving silica from the silicious material is maintained at the highest efficiency.

The gel, after filtration, may be subjected to one or more water washes to remove excess of sodium carbonate, and the wash water is likewise returned to the process. Following the water wash, the gel may then be washed with a weak acid to neutralize any sodium carbonate which may be retained after the water washing. The washed gel is then dried at a temperature of about 110° C. for approximately one hour. The product is a white, fluffy powder having an apparent density of about 0.2, a loss on ignition of about 20%, and a silica content of not less than 90% and usually in excess of 95%, figured on the anhydrous basis.

In the specific example given above, it will be observed that the raw material employed was a clay having the characteristics and approximate composition of kaolinite. The process is particularly adaptable to make use of many different clay materials of this general type and other silicious materials, and contemplates the employment of materials which in either the raw or acid treated state may have little or no adsorbent and purifying properties, and mineral substances which primarily or when subjected to an acid treatment may have some or less valuable properties as adsorbents and purifying agents.

The carbonate digestion and subsequent phases of the process are adaptable to the treatment of silicious residues of prior chemical treatments which serve to place the silicious material in similar chemical and physical condition as that acquired by residues resulting from the acid treatment of clays and similar silicates. It is in connection with the utilization of the silicious residues of other chemical treatments that the present invention is of particular value. Several chemical processes, from which a silicious by-product suitable for use as a source of silica is obtained, often involve the employment of organic substances, for example, the use of glue as a coagulant in the manufacture of aluminum sulfate, with the result that organic matter is usually contained in the silicious residues. Such residues when calcined prior to the alkaline digestion in accordance with the present invention may be utilized in the process without impairing the capacity of the alkaline solution for dissolving silica from subsequent batches of silicious by-products. Accordingly, whatever the source of the silicious material, the invention contemplates an oxidation of the organic matter contained in the silicious material prior to the digestion of the latter in the alkaline solution.

I claim:

1. In the process involving digestion of silicious material in an alkaline solution and subsequent precipitation of silica dissolved therein, the improvement which comprises calcining prior to digestion silicious material containing organic matter at temperatures not exceeding about 750° C. to remove organic matter therefrom.

2. In the process involving digestion of silicious material in an alkaline solution and subsequent precipitation of silica dissolved therein, the improvement which comprises calcining prior to digestion silicious material containing organic matter at temperatures of about 600–625° C. to remove organic matter therefrom.

3. In the process involving digestion of silicious material in an alkaline solution and subsequent precipitation of silica dissolved therein, the improvement which comprises calcining prior to digestion silicious material containing organic matter at temperatures not exceeding about 750° C. to remove organic matter therefrom, and reusing the alkaline solution remaining after precipitation and separation of silica therefrom for digesting further quantities of silicious material.

4. The method of preparing an active silica which comprises treating silicious material with acid, calcining the acid treated material containing organic matter at temperatures not exceeding about 750° C. to remove organic matter therefrom, digesting the material in a hot alkaline solution, precipitating silica from the solution, and separating the silica therefrom.

5. The method of preparing an active silica which comprises digesting silicious material in an acid solution, separating the solid residue from the acid soluble substances, calcining the residue containing organic matter at temperatures not exceeding about 750° C. to remove organic matter therefrom, digesting the residue in an alkaline solution, and cooling the solution to precipitate silica therefrom.

6. The method of preparing an active silica which comprises treating silicious material with acid, calcining the acid treated material containing organic matter at temperatures not exceeding about 750° C. to remove organic matter therefrom, digesting the calcined acid treated silicious material in a hot alkaline solution, separating the solid residue from the solution while maintaining the latter at an elevated temperature, and cooling the solution to form a silicious precipitate.

7. The method of preparing an active silica which comprises digesting silicious material in an acid solution, separating the solid residue from the acid soluble substances, calcining the residue containing organic matter at temperatures not exceeding about 750° C. to remove organic matter therefrom, digesting the calcined residue in a hot alkaline solution, separating solid residue from the solution while maintaining the latter at an elevated temperature, cooling the hot solution to form a silicious precipitate, separating silica from the solution, and reusing the solution for digesting further quantities of silicious material.

8. The method of preparing an active silica which comprises treating silicious material with acid, calcining the acid treated material containing organic matter at temperatures not exceeding about 750° C. to remove organic matter therefrom, digesting the material in a hot alkali carbonate solution, cooling the solution to precipitate silica therefrom, treating the solution with carbon dioxide in an amount substantially equal to that lost during digestion to further substantially complete precipitation of silica from the solution, separating silica from the solution, and reusing the solution for digesting further quantities of silicious material.

9. The method of preparing an active silica which comprises digesting calcined clay in a strong mineral acid solution, separating the silicious residue from the acid soluble substances by washing with water, calcining the residue containing organic matter at temperatures of about 600–625° C. to remove organic matter therefrom, digesting the calcined residue in a hot sodium carbonate solution, separating solid residue from the solution while maintaining the latter at substantially the elevated temperature of digestion, cooling the solution to form a silicious precipitate, treating the solution with carbon dioxide in an amount substantially equal to that lost during digestion to further substantially complete precipitation of silica from the solution, separating the precipitate from the solution, and reusing the solution for digestion of other quantities of silicious material.

GEORGE E. TAYLOR.